United States Patent [19]

Amariti et al.

[11] 4,158,634

[45] Jun. 19, 1979

[54] PARTICLES OF THERMOPLASTIC POLYMER, AND PROCESS OF MAKING THE SAME

[75] Inventors: Luigi Amariti, Niles; John S. Juskey, Rolling Meadows; Shapoor Azari, Wheeling; Thomas J. Kucera, Evanston, all of Ill.

[73] Assignee: Apeco Corporation, Des Plaines, Ill.

[21] Appl. No.: 836,039

[22] Filed: Sep. 23, 1977

[51] Int. Cl.$^2$ .......................... G03G 9/08; C08K 5/00; B02C 23/18

[52] U.S. Cl. .............................. 252/62.1 P; 260/34.2; 260/78 S; 96/1 SD; 528/491; 536/77; 536/86; 241/15; 106/198

[58] Field of Search .................... 260/34.2, 78 S, 96 R, 260/2, 3; 106/198; 252/62.1 P; 96/1 SD; 241/1.5, 20, 22; 528/491; 427/214, 221, 222; 536/77, 86

[56] References Cited

U.S. PATENT DOCUMENTS

| 2,130,948 | 9/1938 | Caruthers | 260/34.2 |
|---|---|---|---|
| 2,359,878 | 10/1944 | Schupp | 260/34.2 |
| 2,374,126 | 4/1945 | Peters | 260/34.2 |
| 2,504,208 | 4/1950 | Locke et al. | 106/198 |
| 3,594,342 | 7/1971 | Ratzsch | 260/34.2 |
| 3,971,749 | 7/1976 | Blunt | 260/34.2 |

FOREIGN PATENT DOCUMENTS 25057  7/1973  Japan ..................................... 260/78 S Primary Examiner—Roland E. Martin, Jr.
Attorney, Agent, or Firm—Leydig, Voit, Osann, Mayer & Holt, Ltd.

[57] ABSTRACT

Finely comminuted particles of a normally solid thermoplastic organic polymer, which is particularly useful as a toner base for electrostatic reproduction utilizing pressure fusing on the toner, is prepared by dissolving a polymer in a normally solid first solvent, cooling the resulting solution to form a friable solid, and removing the first solvent from the solid, preferably by extraction with a normally liquid, relatively volatile, second solvent in which the polymer is substantially insoluble. When using the process to make magnetic mono-component toners, powered magnetic material and/or carbon black or other pigment are added to the solution of polymer and first solvent.

14 Claims, No Drawings

PARTICLES OF THERMOPLASTIC POLYMER, AND PROCESS OF MAKING THE SAME

BACKGROUND OF THE INVENTION

This invention concerns the preparation of finely comminuted particles of a normally solid thermoplastic organic polymer. In one aspect, it concerns the preparation of such particles in a form where it constitutes a highly desirable toner for electrostatic reproduction processes. Still more particularly, the invention provides a unique toner composition which permits toner fixation by pressure fusion to give a matte finish copy. The invention will be described in conjunction with such toner, although the invention is applicable to a wide variety of other processes.

In the various processes of electrostatic reproduction (see "Reprography", in Kirk-Othmer's Encyclopedia of Chemical Technology, Vol 17, Second Edition), electrostatically charged particles of a pigmented toner are caused to adhere to an image on a sheet of paper or other substrate, and are then permanently fused (or fixed) onto the paper by the application of heat or pressure. The use of such toners in electrostatic reproduction processes is exemplified in, for example, Nelson U.S. Pat. No. 3,639,245, Kotz U.S. Pat. Nos. 3,816,840, Kotz U.S. Pat. No. 3,909,258, Strong U.S. Pat. No. 3,965,022, and Shely U.S. Pat. No. 3,563,734.

A particular problem arises when fusion is effected by pressure. While pressure fusion provides advantages from the standpoint of rapid trouble-free apparatus, it frequently results in a glossy copy, especially where there is an extensive black area on the print. Glossy prints are undesirable from the standpoint of the user, who frequently objects to the annoying reflections from overhead illumination.

The common technique of manufacturing toners in finely comminuted form by such procedures as fine grinding, micronizing, spray drying, or the like has thus far been unable to provide toners which give a matte, as distinguished from a glossy, appearance. It is theorized that particles of a pigment such as carbon black, when incorporated into such toners, are dispersed or suspended in the body of each polymer granule, and thus are unavailable at the copy surface after a toner has been pressure fused onto a substrate.

Accordingly, a primary object of the invention is to provide a toner for electrostatic reproduction processes utilizing pressure fusion as a fixation technique, which toner gives a matte finish copy.

Another object is to provide a unique process for preparing finely comminuted particles of a normally solid thermoplastic organic polymer.

Still another object is to provide finely comminuted particles of a normally solid organic thermoplastic polymer, where the particles or granules of the polymer contain carbon black dispersed in the body of the granules as well as carbon black as an adherent coating on the granules.

SUMMARY OF INVENTION

Briefly, and in accordance with the invention, a process is provided for preparing finely comminuted particles of a normally solid organic thermoplastic polymer. The process, in broad aspect, comprises dissolving the polymer in a normally solid first solvent, used in sufficient excess to maintain the polymer and the solvent as a macroscopic homogenous friable solid when the resulting mass is cooled. The dissolution is effected at elevated temperature, above the melting point of the first solvent.

The resulting mass is then cooled below the solidification temperature. The first solvent is then removed, and the resulting solid residue is obtained as the desired finely comminuted form of the polymer.

In one highly desirable embodiment of the invention, the first solvent is removed from the cooled mass of polymer and first solvent by extracting out the first solvent with a normally liquid, relatively volatile, second solvent for the first solvent, and one in which the polymer is substantially insoluble at extraction temperature. This technique is an unusually simple process for providing micro-sized particles of virtually any thermoplastic polymer.

A particularly advantageous feature of the invention is that fine powders or granules of insoluble pigments or other solids may be incorporated into selected areas of the finely comminuted particles. Thus, where it is desired to incorporate, for example, carbon black within the individual particles or granules of the polymer, the black is added to the melt of polymer and first solvent, where it remains as a fine dispersion in the cooled mass. On the other hand, and particularly when a matte-finish toner is desired, carbon black may be added to the mass while it is undergoing extraction by the second solvent; in this case, the carbon black remains as an adherent surface coating on each particle or granule, and, after pressure fusion, remains on the surface of the copy where it serves to reduce specular gloss.

Another advantageous feature of the invention resides in the ability to produce magnetic mono-component toners, that is, toners having a powdered magnetic component incorporated into the particles or granules of polymer. These toners are especially adapted for the so-called magnetic brush technique of distributing toner particles onto an electrostatically charged and imaged substrate. To this end, magnetic powders are simply added to the melt of polymer and first solvent, and the final particles are recovered in a form which contains the magnetic powder dispersed in the body of each polymer particle or granule.

While the invention is particularly suited and adapted to the preparation of toner for electrostatic reproduction processes, it will be apparent that it is not so limited. Thus, for example, the invention provides a unique technique for the manufacture of finely comminuted particles of virtually any normally solid thermoplastic organic polymer for a variety of applications; for example, powder coating, pharmaceuticals, solid lubricants, etc.

DETAILED DESCRIPTION

Various alternative embodiments of the invention will be described below. Bearing in mind that the particular field of direct interest is in the manufacture of toners, the exemplary illustrations are directed specifically to the optimum procedures and processes for making such toners. Where, however, the special requirements and attributes of toners are either unnecessary or undesirable for utilities other than as toners, the procedures described below may be varied to achieve the desired final product.

Polymers

The process of the invention is adaptable to almost any normally solid thermoplastic organic polymer, provided only that a first solvent is available which permits the polymer and solvent to form a melt that can be cooled to a macroscopically (i.e., with the naked eye) homogeneous, friable, solid. As illustrated in the specific Examples below, these may include polyamides, polyamines, substituted cellulose polymers, vinyl polymers, acrylic and methacrylic acid polyesters, polyolefins, epoxy polymers, polystyrenes, polyvinyl acetate, and the like. Other examples of normally solid thermoplastic organic polymers include those listed in Billmeyer's Textbook of Polymer Science (Interscience 1964).

Specific examples of such polymers include Unirez 2940 and 2950 polyamide, AC 639 low molecular weight polyethylene (Allied Chemical), Epon 1002 epoxy resin (Shell Chemical), Acryloid B-72 acrylic resin (Rohm & Haas), Versamid 940 polyamide (General Mills), Epolene E-43 polyethylene (Eastman Chemical), DeSoto 22 D-54 polystyrene resin (DeSoto Chemical Co.), etc.

First Solvent

The "first solvent", which is employed to form a melt or molten mass by dissolving the polymer, at elevated temperature, is a normally solid material capable of interacting physically, as distinguished from chemically, with the polymer so that, after cooling, it forms a macroscpically homogenous, friable, solid.

It is apparent, therefore, that a considerable number of solvents may, both in theory and in practice, be used. Apart from its having the necessary solubility properties with respect to the organic thermoplastic polymer, the first solvent should be chemically inert, and, optimally, should be removable in whole or in part from the solidified polymer-solvent mass. The selection of a suitable solvent will therefore be dependent on the particular organic thermoplastic polymer which is to be employed, and for this reason empirical factors are the prime considerations. This solvent, of course, must be solid at normal processing conditions, that is, at "room" temperature of approximately 20° C., and also should form a solid mass with the dissolved polymer. Many such first solvents are listed in available compendia, as for example, Schwartz and Perry's "Surface Active Agents" (Interscience 1949), and Schwartz, Perry, and Berch's "Surface Active Agents and Detergents" (Interscience 1958).

It has been discovered, however, that the tertiary butyl substituted phenols, that is, compounds having at least one hydroxyl group and at least one tertiary butyl group on a benzene ring, constitute an especially desirable class of first solvents. Not only do they have high solvent properties for most, if not all, of the thermoplastic organic polymers, but they are readily removable by simple removal techniques, e.g., solvent extraction, from the polymer-first solvent mass for ultimate preparation of the finely comminuted particles. Among the suitable tertiary butyl phenols are the isomeric monotertiary butyl phenols, the 2,6-di tert-butyl methyl phenol, the 2,4,6-tri tert-butyl phenol, the 2,2-methylenebis-(4-methyl-6-tert-butyl phenol), the 2,2-thiobis-(4-methyl-6-tert-butyl phenol), and the 2,5-di-tert-butyl hydroquinone. Most of the experimental work underlying the present investigation has been conducted with the 2,6-di-tert-butyl methyl phenol, available commercially as Ionol C P antioxidant (Shell Chemical Division, Shell Oil Co.), or C A O-1 (Ashland Chemical).

Pigment

For many applications it is desirable to include a solid, insoluble, pigment in the finely comminuted polymer. In this case, the polymer particles or granules have the pigment particles dispersed in the body of each polymer granule.

For electrostatic reproduction processes, the pigments of choice are the various forms of finely divided carbon black, desirably those which are electrically conductive. See Kirk-Othmer, Volume 4, "Carbon (Carbon Black)". Commercially available examples of such blacks, particularly the acetylene blacks, include Raven 410 and Raven 1040 (Columbian Carbon), Molacco black (Columbian Carbon), etc.

In place of, or in addition to, carbon black, various other pigments of different colors may be utilized, for example, finely divided silica may be used where white printing on a dark background is desired, or other colored pigments may similarly be substituted.

Magnetic Particles

For the preparation of a homogenous toner, powdered or otherwise finely divided magnetic or magnetizable powders may be incorporated in the melt. As with the pigment, these powders are dispersed in the body of the polymer granules.

Suitable magnetic or magnetizable powders are described, for example, in Kirk-Othmer, "Iron Compounds" in Volume 12, and in "Ferrites" in Volume 8. Illustrative commercially available materials include No. 3006 and No. 5000 (Wright Industries), Ferrous (ic) oxide (City Chemical), HR 280 (Hercules) magnetic pigments etc.

Other Additives

Where desired for particular purposes, or to modify particular parameters in the final product, various other additives may be included in the polymer-solvent melt.

For example, plasticizing agents such as dibutyl phthalate, behenic acid, stearic acid, paraffin wax, dibutyl thiourea, or the like may be included for the purpose of giving either a softer or a lower melting point product. Similarly, antistatic agents such as various electrolytes may be added.

Dissolution Step

As the first step in the process of the invention, the normally solid organic thermoplastic polymer is dissolved in a suitable normally solid solvent; the so-called first solvent.

This first solvent, which is utilized in a weight excess over the polymer, is employed to dissolve the polymer as a melt at elevated temperature, and to thereafter form a friable solid upon cooling to processing temperature as set forth below.

Practically, this requires a weight ratio of first solvent to polymer in the range of more than 1:1 and up to about 10:1, advantageously above 2:1 to about 5:1. With the first solvent of choice, namely the tertiary butyl phenols, the optimum range set forth is especially advantageous for most thermoplastic polymers, with the exception of crystalline polypropylene, which has limited solubility in all common normally solid first solvents.

Dissolution temperatures in the range of about 100° to about 160° C. been found to be especially advantageous when a tertiary butyl phenol is used. The tertiary butyl phenol, in every tested case, melts well above room temperature, and is a mobile liquid above 100° C., at which temperature it possesses exceptional solvation properties with respect to most thermoplastic polymers.

As noted earlier, the first solvent is employed in a sufficient excess to maintain the polymer and solvent as a macroscopically homogenous solid after subsequent cooling. To all intents and purposes, this condition, that is, of being unable to distinguish visually between a polymer "phase" and a first solvent "phase" when the mass is cooled, is an important prerequisite to the successful practice of the invention; on the other hand if either the dissolution step or the subsequent cooling step is so conducted as to permit two phases to form upon cooling, there cannot be adequate comminution of the polymer when the first solvent is later removed.

Cooling Step

After forming the melt or solution of thermoplastic polymer in first solvent, the next step is cooling the mass below the solidification temperature of the mass.

Cooling does not appear to be a critical variable of the process, as successful runs have been made at widely varying clooling rates. In point of fact, on a laboratory scale it has been found entirely satisfactory to decant the melt into a shallow pan, and permit the melt to solidify on ambient exposure.

For larger quantities of product it may be desirable to regulate the cooling rates. From experience with other materials, rapid cooling is conducive to the avoidance of a well crystalized separate polymer phase. Accordingly, where the first solvent possesses only limited solvent properties with respect to the polymer, or where the quantity of first solvent relative to the polymer is low, it may be desirable to effect rapid cooling of the melt in order to minimize crystallization. On the other hand, where the application for which the finely comminuted particles are to be used either does not require extremes of division, or where larger particles are desired, a slower cooling rate may be selected in order to encourage the formation of somewhat larger crystallites of polymer from the melt or magma.

Initial Fragmentation Step

After the polymer-solvent mixture has been cooled to below the solidification temperature of the mass, and advantageously after the mass has fully solidified, it is desirable to effect an initial comminution or fragmentation of the now friable solid. This is merely to permit the first solvent to be removed at a comparatively rapid rate, and need not be so careful or fine to cause any significant comminution of the polymer. Since the solidified melt is friable, that is, somewhat brittle, the mass is readily fractured and fragmented in a conventional grist mill. Other fragmentation techniques may, of course, be substituted, depending on the size of the batch.

Removal of First Solvent

To recover the normally solid organic thermoplastic polymer in finely comminuted form, it is first necessary to remove much or all of the first solvent. Inasmuch as the solidified melt of solvent and polymer is composed predominantly of the solvent, the procedure utilized to remove the solvent will depend largely on the properties of the first solvent.

Accordingly, many alternative separation techniques may be used to remove the first solvent from the polymer-solvent mass and these techniques may be used singly or in combination. For example, the first solvent may be sublimed out, advantageously under vacuum or in the presence of an inert carrier gas.

The technique used for removing the first solvent may either be chemical or physical, or a mixture of the two. For example, the first solvent can be reacted with a chemical reagent to decompose or dissolve the former; this technique may be advantageous. In either case, the first solvent removal technique depends primarily on the physical and/or chemical characteristics of the first solvent, and accordingly offers a wide range of choices.

Removal of First Solvent By Solvent Extraction

By far and away the most highly advantageous technique of removing the first solvent from a solidified polymer—first solvent mass is by the use of a second solvent having the necessary selective solvent properties. In other words, the second solvent should be a good solvent for the first solvent, but it should have substantially no solubility effect on the polymer at the extraction temperature. Additionally, the second solvent should be a liquid under normal conditions of pressure and temperature, and should be relatively more volatile than the first solvent so that it can be removed readily from the final comminuted polymer.

It has been found that the predominantly aliphatic hydrocarbons particularly those in the gasoline or naphtha boiling range, are unusually effective second solvents. They have a high degree of solvency for the first solvent, yet almost all of the thermoplastic polymers are substantially insoluble in aliphatic hydrocarbons at normal extraction temperatures of about 20°–50° C. Typical commercially available aliphatic hydrocarbon mixtures include Isopar G (Exxon) and Shell-Sol (Shell Chemical); the former is described as a narrow-cut isoparaffinic hydrocarbon fraction boiling at approximately 160°–174° C.

Other second solvents may be employed, including acetone, VM & P Naphtha, methyl ethyl ketone, methyl isobutyl, ketone, etc.

The amount of second solvent used to remove the first solvent depends on the identities of the two solvents, the amount of first solvent relative to the polymer, and the extent of desired first solvent removal. Usually there will be about one part by weight of second solvent per part of first solvent, although this may increase to, for example, as much as five or even more parts by weight of the second solvent per part of first solvent, depending on the factors enumerated above. Most commonly, the proportion of second solvent to first solvent will be in the range of about 2:1 to about 5:1, and this effects more than 90% removal of most tertiary butyl phenol first solvents.

It has been found that optimum solution of the first solvent and extraction of the same from the polymer—first solvent mass is best effected when the mass and solvent are intimately dispersed under severe shear conditions. Thus, on a laboratory scale, a Waring Blendor or similar domestic liquefier may be utilized. On a pilot plant scale, a mechanical high speed rotary emulsifier, such as a Ross 570 device, is kjustified in the latter case, a temperature increase upon emulsification, serves as a ready gauge of the extent of emulsificaton; a 10° or 20° C. rise in batch temperature signifies a sufficiently good level of liquid-solid contact and also of first solvent extraction.

Incorporation of Pigment In Solvent Extraction Step

When, particularly in the prepartation of a matte finish toner, it is desired to coat the individual polymer granules with an adherent surface coating of a solid pigment, this may be effected by introducing the pigment into the mass of polymer—first solvent and second solvent.

While experimental evidence has not yet been obtained, it is believed that the second solvent causes a surface softening of the polymer granules, causing the pigment to adhere to the outer surface of each granule. As a consequence, the granules are coated with a solid material, which remains exposed when the toner granules are pressure fused in an electrostatic reproduction process.

A pigment of choice is carbon black. In this case, however, a less conductive black, such as one of the channel blacks, is to be preferred in order to minimize particle-particle conduction. The proportion of pigment, e.g., carbon black, to plastic polymer may vary widely, as for example in the range of 1:10 to 10:1 on a weight basis.

Final Comminution Step

After extraction of the polymer—first solvent mass with the second solvent, the second solvent is removed to the fullest extent possible. This ordinarily may be effected by vacuum filtering, accompanied if desired by one or more washes with either the second solvent or, advantageously, an even more volatile third solvent such as acetone. The resulting filter cake is then a slightly moist, or even dry, powder.

The filter cake can then be broken up, as it is a finely comminuted material having essentially no bond strength between particles or granules. It is desirable, however, to insure that the polymer is in an extremely fine state of subdivision, and to this end filter cake is advantageously passed sequentially through a series of vibratory screens, ending with a 200 mesh (U.S. Standard) screen.

The screened powder may be dried, typically at about 65° C. for several hours in an oven, and is then ready for use.

EXAMPLE I

This example illustrates the preferred preparation of an electrostatic reproduction toner.

A solution is prepared at 120° C. by melting 12 parts by weight of 2,6 di-tertiary butyl p-cresol and adding 3 parts by weight of a low molecular weight polyamide resin. The resin is Unirez 2950, manufactured by Union Camp Corporation, and described in product bulletin R475; the material has a melting point (ring and ball) of 90°–100° C., a viscosity at 160° C. of between 450 and 950 centipoises, an acid number of 4, and an amine number of 2. Unirez 2950 contains paraffin wax which imparts good slip properties to the dry powder.

With constant stirring, 5 parts by weight of magnetic iron oxide powder (No. 3006, Wright Industries), and one part of carbon black (Shawinigan Acetylene Black, Gulf Oil Canada, Ltd.), are added, and the mixture well agitated.

The mixture is then poured into a flat tray in a thickness of about ½ inch and cooled to room temperature whereupon it solidifies. The mass is broken up, and ground in a conventional grist mill (Sears) to produce a coarse powder.

Twenty-one parts of the powder is charged into a mechanical high speed emulsifier (Ross 570), along with 42 parts of an isoparaffinic petroleum naphtha (Isopar G, Exxon) and one part of carbon black (Cabot 1040). After about 10 minutes, the temperature reaches about 45° C. Under these conditions, the 2,6 di-tertiary butyl p-crespol is dissolved by the Isopar G, while the carbon black particles form an adherent surface coating around the remaining solid particles of the polyamide resin.

The slurry is vacuum filtered.

The filter cake is then broken up and passed sequentially through 60 mesh, 120 mesh, and 200 mesh (U.S. Standard) vibratory screens (Russel finax), and the resulting finely comminuted particles dried in an oven at about 65° C. for several hours. It is then passed through a 250 mesh screen. The residual phenol content is about 7% by weight.

To test the powder, an Apeco 776 copier is employed. This utilizes a zinc oxide coated photosensitive paper, and pressure fuses the toner particles or powder at about 180 pounds per linear inch. An electrostatic image is formed on the paper; the paper is treated with the toner powder of the Example; and the toner then pressure fused. The gloss meter reading ("Glossard System 60", Gardener Laboratory Inc.) is about 8.

EXAMPLE II

Example I is repeated, except that a low molecular weight polyethylene (AC639, Allied Chemical) is substituted, on a weight-for-weight basis, for the polyamide resin.

The gloss meter reading is 20, indicating some loss of the matte properties of the toner when employing polyethylene.

EXAMPLE III

In this Example, a finely comminuted polymer is prepared which includes both finely divided magnetic particles and carbon black particles dispersed within the granules of polymer, but without an adherent surface coating of carbon black.

A mixture is prepared of 100 grams 2,6 di-tert-butylmethylphenol (Ionol CP, Shell Chemical Co.; see Shell Technical Bulletin, April 1969), 10 grams of low molecular weight polyethylene (AC639, Allied Chemical), and 10 grams of finely divided magnetite (No. 3006, Wright Industries). The Ionol melts at about 70° C.; the mixture is prepared at 120° C. and, after mixing, is cooled in a tray to room temperature.

The Ionol is removed by grindind up the solidified mass and then extracting with 400 grams of Isopar G at 40° C.

The cake is dried at 60° C. for several hours, and then worked with a brush through a 200 mesh screen to provide a toner. Testing of the toner demonstrates adequate but not outstanding copy quality.

EXAMPLE IV

This Example illustrates the preparation of the toner utilizing a highly conductive carbon black in the polymer-solvent melt as well as on the powder surface.

The melt is prepared with 80 grams of 2,6 di-tert-butylmethylphenol (Ionol), 20 grams of low molecular weight polyamide resin (Unirez 2950, Union Camp), 20 grams magnetite (No. 5,000, Wright Industries), and 5 grams acetylene carbon black (Molacco, Columbian Carbon) at 120° C. The mass is then cooled and ground.

One hundred twenty one grams of the cooled and ground mass is dispersed in 400 cc aliphatic solvent (Shellsol, Shell Chemical) and 5 grams of additional Molacco black is added. The mixture is stirred in a Waring Blendor, and then vacuumed filtered. The procedure of Example III is then followed to prepare the toner.

Prints using the screened toner had an excellent appearance, with only slight fringing.

EXAMPLE V

In this Example, the procedure of Example IV is repeated, except that a highly conductive carbon black is included in the original melt to impart electrical conductivity to the toner particles, while a relatively non-conductive carbon black is included in the extraction step to provide a relatively non-conductive external surface.

The original melt is composed of 80 grams Ionol, 20 grams polyamide (Unirez 2940), 20 grams magnetite (3006, Wright Industries) and 5 grams acetylene black. The non-conductive carbon, added to the extraction step, is 10 grams Raven 1040 (Columbian Carbon).

The final toner gave a matte image in which fringing is completely eliminated.

EXAMPLE VI

In this Example, an experiment is conducted utilizing a different first solvent.

For the experiment, 200 grams of 2,6 di-tert-butylmethylphenol (CAO-1, Ashland Chemical Co.), 100 grams polyamide (Unirez 2950), and 100 gram of magnetite (No. 5,000, Wright Industries) are mixed together, and stirred on a hot plate for 5 hours at about 120° C. The mixture is then poured into a flat pan, cooled to solidity, and fragmented.

One hundred forty grams of the solid and 5 grams of carbon black (Molacco, Columbian Carbon) are transferred to a blender, and 400 cc of isoparaffinic solvent (Shellsol) are added. The mixture is mixed for a few minutes until the temperature is about 40° C. and a smooth dispersion results.

After cooling to about 29°-30° C., the dispersion is vacuum filtered, allowed to stand uder room conditions until it appears dry, and then worked with a hand brush through a succession of screens, 80 mesh, 200 mesh, 270 mesh, and 400 mesh. It is then dried to constant weight in an oven at 62° C.

EXAMPLE VIII

This Example illustrates the preparation of a toner utilizing an acrylic ester resin.

A mixture is prepared from 125 grams 2,6 di-tert-butylmethylphenol (CAO-1, Ashland), 25 grams thermoplastic acrylic ester (Acryloid B72, Rohm & Haas), 25 grams magnetite pigment (No. 3006, Wright Industries), and 6.2 grams carbon black (Molacco, Columbian Carbon). The substituted phenol is first melted at 160° C., and the remaining ingredients added incrementally, with stirring after addition of the magnetite and after addition of the carbon black for approximately 5 hours each. The mixture is then cooled with stirring to 64° C., then decanted into a flat pan and cooled to solidification.

After rough grinding, 140 grams of the solidified mixture, plus 5 grams of carbon black and 400 cc of Shellsol solvent are placed in a Waring Blendor, and stirred until a smooth mixture is formed at a temperature about 51° C. It is then cooled, vacuum filtered, and the solids then passed sequentially by hand through an 80 mesh, a 200 mesh, and a 270 mesh screen. The toner is dried overnite at 65° C.

EXAMPLE IX

Utilizing the general procedure described earlier, a toner is made from polystyrene.

Five hundred grams 2,6 di-tert-butylmethylphenol (Ionol), 100 grams polystyrene resin (DeSoto 22 D-54, DeSoto Chemical Co.), and 100 grams magnetite pigment (No. 3006, Wright Industries) are melted together with stirring at about 100° C., then cooled, ground, and extracted.

The extraction mixture consist of 140 grams of the solids, 7.5 grams carbon black (Molacco, Columbian Carbon), and 400 cc solvent (Shellsol, Shell Company), utilizing a Blendor and continuing the blending for 5 minutes.

After vacuum filtering and passing through a 200 mesh screen, toner particles are recovered. They are dried overnite at 65° C.

Testing on an Apeco 776 pressure fusing copier gave copies having excellent density and good background.

We claim as our invention:

1. A process for preparing finely comminuted particles of a normally solid organic thermoplastic polymer, which comprises:
    dissolving said polymer in a normally solid first solvent in a sufficient excess above a weight ration of 1:1 of said solvent to polymer to maintain said polymer and said solvent as a macroscopically homogenous, friable, solid composed predominantly of said solvent when the resulting mass is cooled, said dissolution being at an elevated temperature above the melting point of said solvent,
    cooling said mass below the solidification temperature of said mass to form said macroscopically homogenous, friable solid mass and comminuting said solid mass,
    removing said first solvent from said mass,
    and recovering the normally solid organic thermoplastic polymer in finely comminuted form.
2. Process of claim 1 including the step of introducing an insoluble pigment into said mass prior to said cooling to thereby disperse the same in said mass.
3. Process of claim 2 wherein said insoluble pigment is carbon black.
4. Process of claim 1 in which said organic thermoplastic polymer is a polyamide resin.
5. Process of claim 1 wherein said organic thermoplastic polymer is polyethylene.
6. Process of claim 1 wherein said organic thermoplastic polymer is an acrylic ester.
7. Process of claim 1 wherein said first solvent is a tertiary butyl phenol.
8. Process of claim 7 wherein said tertiary butyl phenol is 2,6-di-tert-butyl 4-methylphenol.
9. Process of claim 1 wherein said first solvent is removed from said mass by extraction with a normally liquid, relatively volatile, second solvent for said first solvent, in which said polymer is substantially insoluble at extraction temperature.
10. Process of claim 9 wherein said second solvent is an aliphatic hydrocarbon.
11. Process of claim 9 including the step of introducing carbon black into said mass subsequent to said dissolving and prior to said extracting.

12. A process for preparing finely comminuted particles of a normally solid organic thermoplastic polymer, which comprises:

dissolving said polymer in a normally solid first solvent in a sufficient excess above a weight ratio of 1:1 of said solvent to polymer to maintain said polymer and said solvent as a macroscopically homogenous, friable, solid composed predominantly of said solvent when the resulting mass is cooled for subsequent extraction, said dissolution being at an elevated temperature above the melting point of said solvent, cooling said mass below the solidification temperature of said mass to form said macroscopically homogenous friable solid mass and comminuting said solid mass, extracting said first solvent from said mass with a normally liquid, relatively volatile, second solvent for said first solvent, in which said polymer is substantially insoluble at extraction temperature, and recovering the polymer in finely comminuted form.

13. Process of claim 12 wherein said first solvent is a tertiary butyl phenol.

14. Process of claim 12 wherein said second solvent is an aliphatic hydrocarbon.

* * * * *